Dec. 30, 1930. T. U. WHITE 1,786,807
SUPERVISORY CONTROL SYSTEM
Filed March 2, 1926 8 Sheets-Sheet 1

WITNESSES:
G. S. Neilson
Samuel Strolen

INVENTOR
Thomas U. White
BY
Wesley G. Carr
ATTORNEY

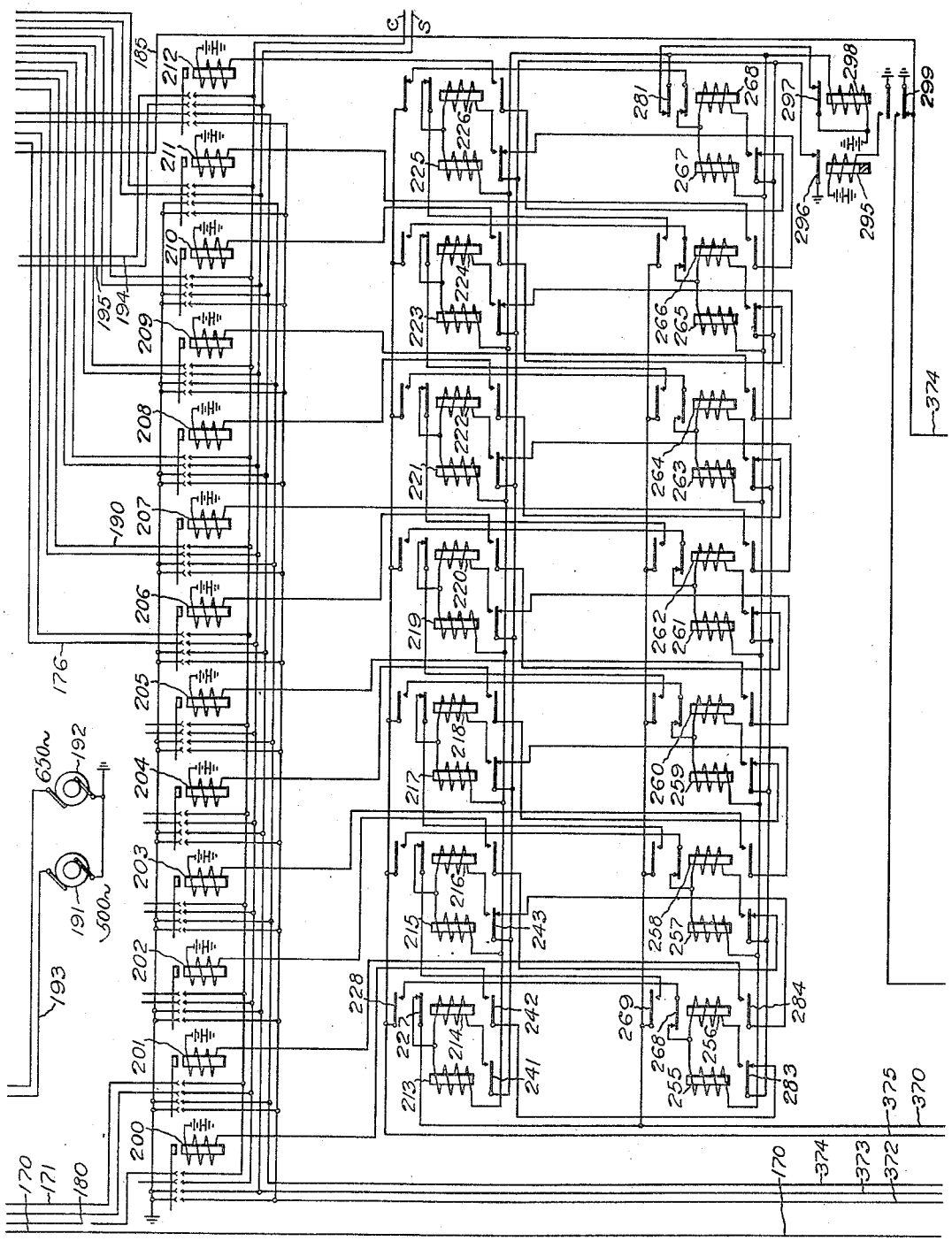

Dec. 30, 1930.                    T. U. WHITE                    1,786,807
                            SUPERVISORY CONTROL SYSTEM
                            Filed March 2, 1926          8 Sheets-Sheet 3

WITNESSES:

INVENTOR
Thomas U. White
BY
ATTORNEY

Dec. 30, 1930.                    T. U. WHITE                    1,786,807
                          SUPERVISORY CONTROL SYSTEM
                          Filed March 2, 1926           8 Sheets-Sheet 4

Fig. 4.

WITNESSES:                                              INVENTOR
                                                    Thomas U. White
                                                          BY
                                                              ATTORNEY Dec. 30, 1930.   T. U. WHITE   1,786,807
SUPERVISORY CONTROL SYSTEM
Filed March 2, 1926   8 Sheets-Sheet 6

WITNESSES:

INVENTOR
Thomas U. White
BY
ATTORNEY

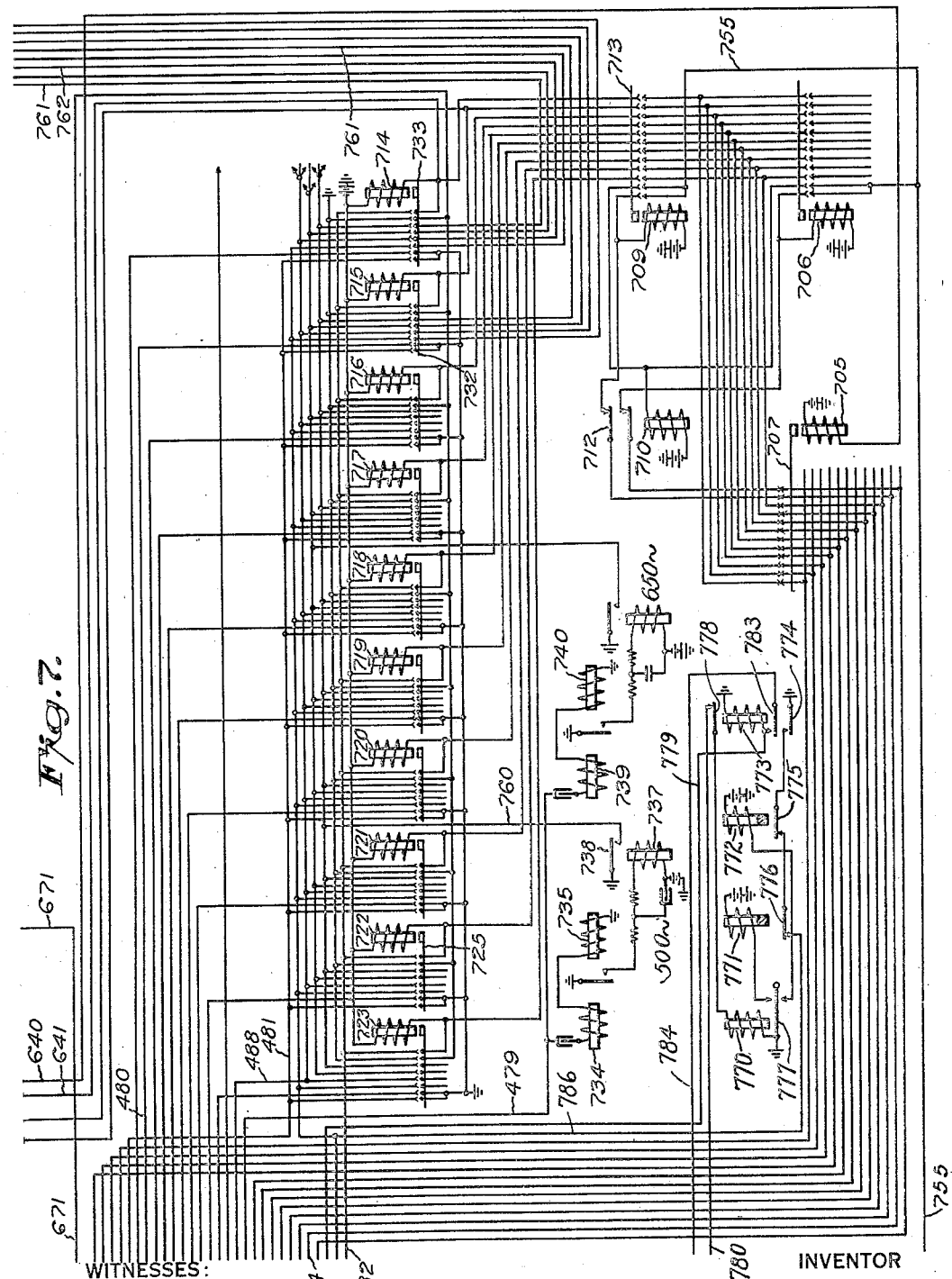

Dec. 30, 1930. T. U. WHITE 1,786,807
SUPERVISORY CONTROL SYSTEM
Filed March 2, 1926 8 Sheets-Sheet 8
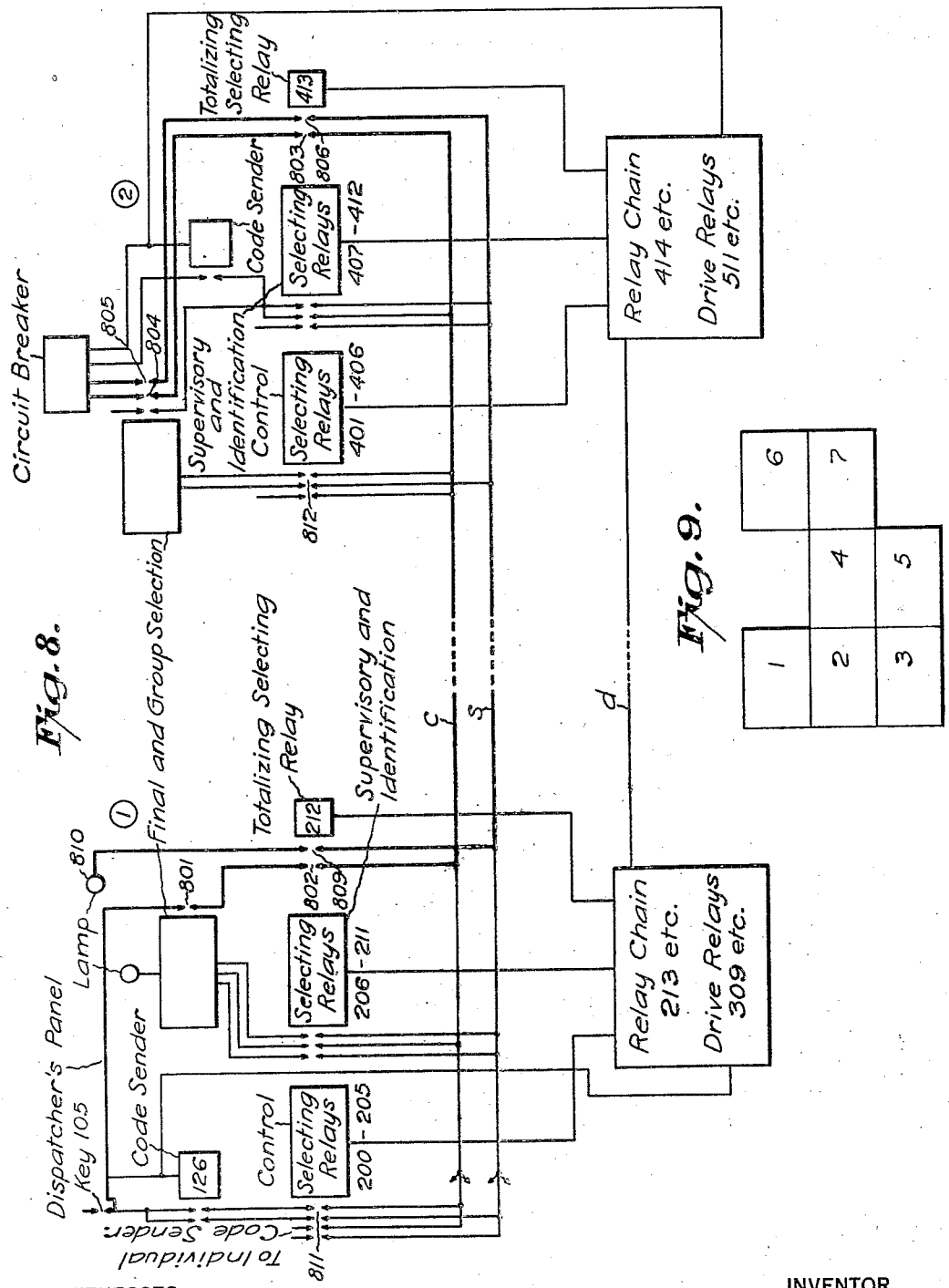
INVENTOR
Thomas U. White
BY
ATTORNEY
WITNESSES:

Patented Dec. 30, 1930

1,786,807

UNITED STATES PATENT OFFICE

THOMAS U. WHITE, OF PITTSBURGH, PENNSYLVANIA, ASSIGNOR TO WESTINGHOUSE ELECTRIC & MANUFACTURING COMPANY, A CORPORATION OF PENNSYLVANIA

SUPERVISORY CONTROL SYSTEM

Application filed March 2, 1926. Serial No. 91,713.

My invention relates to selective signalling systems and more particularly to supervisory control systems wherein power apparatus at a substation is maintained under manual control of an operator at a dispatching station.

An object of my invention is to provide means for applying a uniform code in a supervisory control system to select an apparatus unit at a remote point over cleared line wires.

Another object of my invention is to provide means for operating a relay chain as a distributor in a uniform code system.

Another object of my invention is to provide means for storing registered changes of the position of apparatus units for further transmission by a code to the dispatcher's office.

Another object of my invention is to provide a simplified means for making a large number of selections.

Another object of my invention is to provide means for rendering line surges ineffective to cause false operation in a "cleared line wire" supervisory control system.

There are other objects which, together with the foregoing, will appear in the specification, which follows.

In supervisory control systems, it is very desirable to obtain a clear line wire to the apparatus unit which has been selected for control, thereby placing the apparatus unit under the direct control of the dispatcher. In addition to this obvious advantage of direct control of a selected unit, clear line wires enable additional functions, such as "remote metering" to be performed, as shown in the patent to B. H. Smith, No. 1,614,212, issued January 11, 1927.

Heretofore the foregoing function has been accomplished by means of a relay chain which operated in a step-by-step manner to select the apparatus unit and after selecting the unit, placed it under the direct control of the dispatcher over a clear line wire.

Systems of this type such as that disclosed in Patent No. 1,714,966 dated May 28, 1929, were found, however, to be disadvantageous for direct control in the cases where there was likelihood of considerable inductive surges and it was necessary to devise a code system such as that disclosed in copending application 640,001, in which a plurality of impulses were necessary to make a selection, each code thereafter being totalized so as to protect the system against false selection by inductive surges. This latter type of system sacrifices a good many of the advantages of the relay type heretofore mentioned in that the selected unit is never under the direct control of the dispatcher. In such systems, there are no clear line wires from the apparatus unit at the substation to the dispatcher's office so that remote metering is impossible.

Another disadvantageous feature of the relay chain system is evidenced when the system becomes very large, as, for example, over 50 apparatus units. The dispatcher usually desires to perform a single operation at a time, yet for each operation in a fifty apparatus unit system it is necessary to go through the entire chain of fifty relays entailing a considerable loss of time.

In practicing my invention, I provide a relay chain distributor for transmitting a uniform code from a dispatcher's office to a substation to select an apparatus unit which is thereafter placed under the direct control of the dispatcher, means for informing the dispatcher of the unit selected for operation and supervisory signals at the office to indicate the operation of any apparatus unit.

Referring now to the drawings,

Figs. 1, 2 and 3 are diagrams of the circuits and apparatus at the dispatcher's office.

Figs. 4, 5, 6 and 7 are the circuits at the substation.

Fig. 8 is a diagrammatic view of the entire system, and

Fig. 9 illustrates the arrangement of Figures 1-7.

Figure 1:
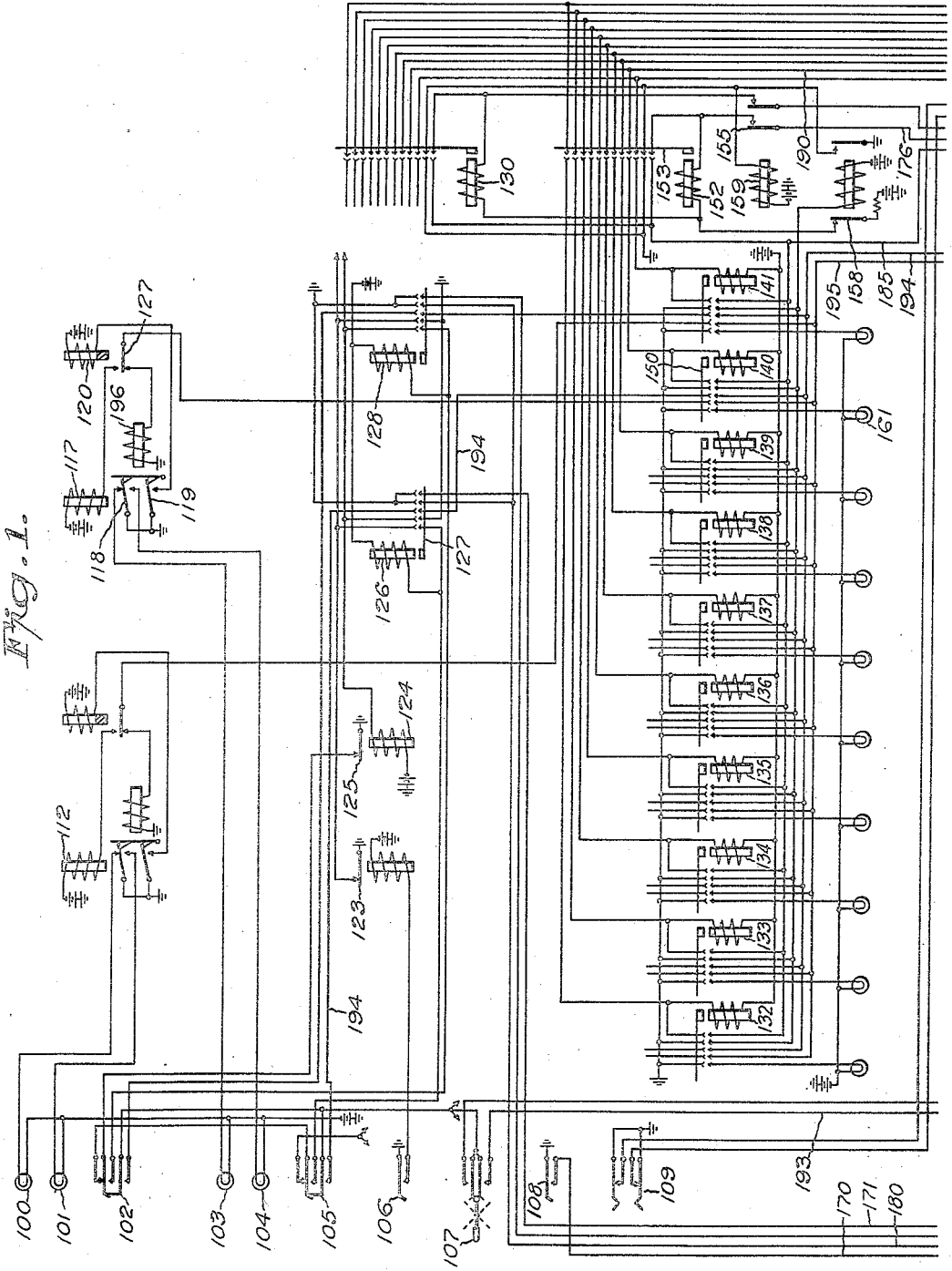

Referring now to Fig. 1, the system comprises a start key 108, a master control key 107, a restart key 106 and individual control keys 102 and 105 with their associated lamps 100, 101, 103 and 104. At 109 is shown the individual "stop" key for the totalizing and control point on the relay distributor. Relays 112 and 117 are supervisory latching relays individual to the several control keys for indicating the open or closed position of the circuit breakers. Relays 126 and 128 are associated with the bank of individual keys for setting up the code to be transmitted. Relays 152 and 130 are supervisory group relays and 132—141 supervisory final selecting relays.

Referring now to Fig. 2, relays 213 to 226 and 255 to 268 are the counting chain relays for controlling the selecting relays 200 to 212 which distribute the code impulses.

Referring now to Fig. 3, relays 312 to 314 and 307 to 309 are the drive relays. Relay 305 is the normal closed line relay, relays 302 to 304 are the start relays. Relays 306 and 311 control the step over from one to the other group of drive relays. Relays 316—319 control the opening of the drive circuit between switchovers from one to the second group of drive relays.

Referring now to Fig. 4, relays 414 to 441 are the counting chain relays at the substation for operating the selecting relays 401 to 413 in synchronism with the selecting relays 200 to 212 at the dispatcher's office, the selector relays distributing the code impulses.

Figure 5:
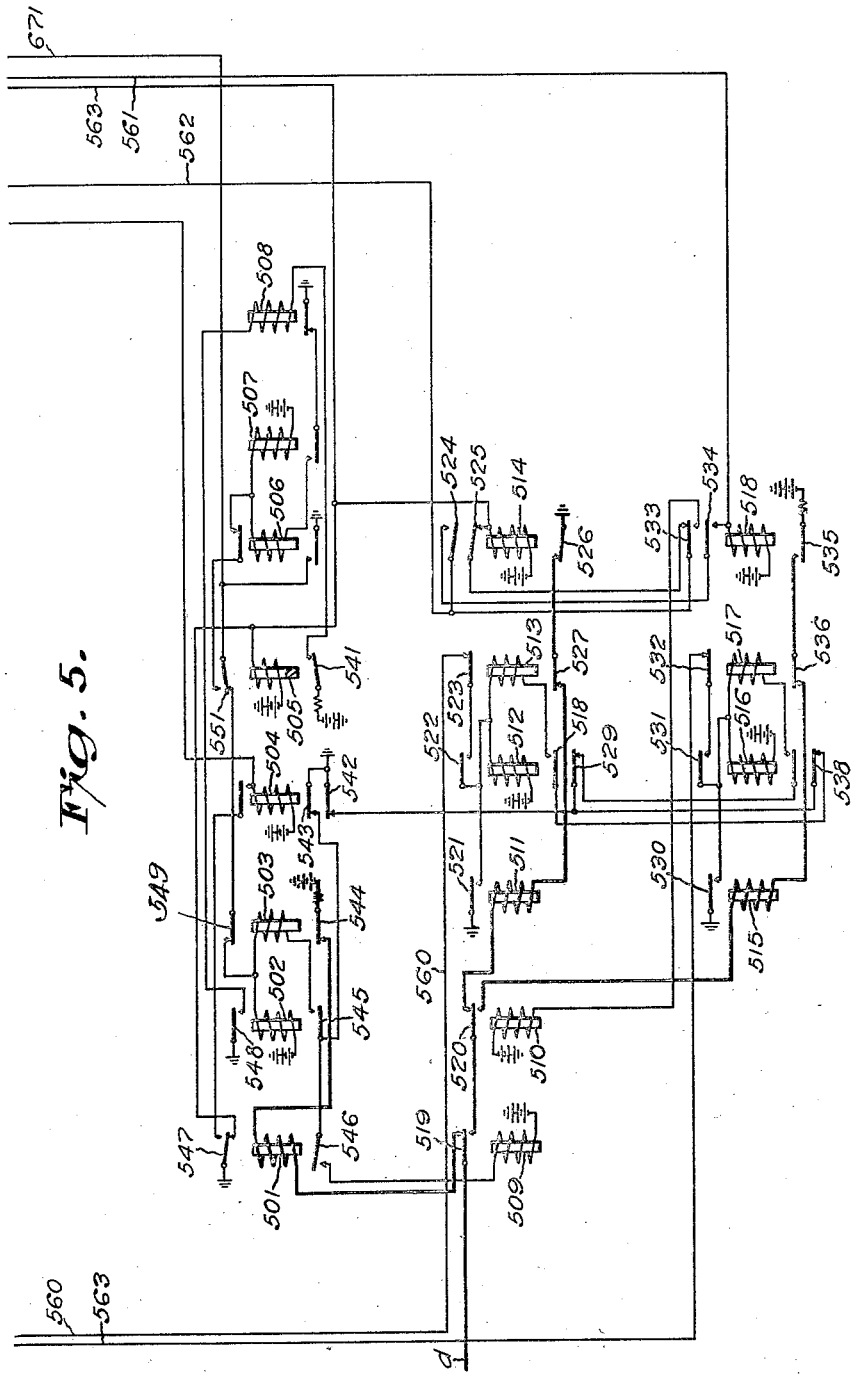

Referring now to Fig. 5, relay 501 is the normal closed line relay, relays 515 to 517 and 511 to 513 are the drive relays, relays 502 to 508 are the supervisory start relays. Relay 510 is the switchover relay controlled by relays 518 and 514.

Figure 6:
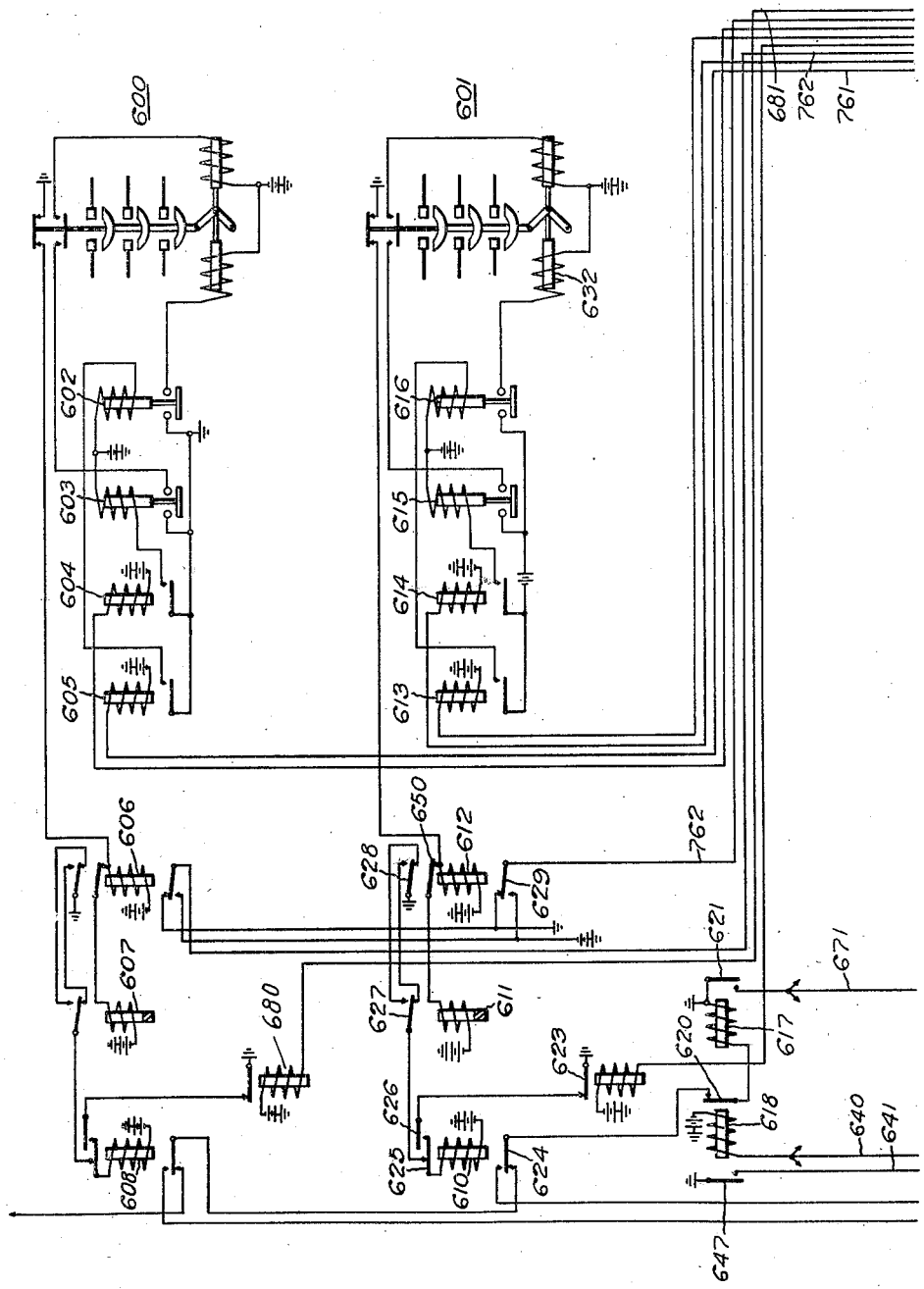

Referring to Fig. 6, 600 and 601 are illustrative of the circuit breakers at the substation. Relays 602 to 605 and 613 to 616 are the interposing control relays and relays 606 to 608 and 610 to 612 are the interposing supervisory relays.

Referring to Fig. 7, relays 706 and 709 are group selecting relays and 714 to 723 are final selecting relays and relays 734, 735, 739 and 740 are the receiving relays.

Referring to Fig. 8, the key 105 is illustrative of one of the plurality of individual control keys and similarly the various groups of the system are illustrated by rectangular views and labelled.

My invention comprises, in general, a dispatcher's office 1 and a substation 2 connected by two signalling lines, a synchronous drive line and a common return. At each station 1 and 2 I provide relay chains 213 and 414 and selecting relays 200 to 211 and 401 to 412 operated in synchronism by means of drive relays 309 and 511.

In order to understand the general steps of the operation, a brief description thereof will be given in connection with Fig. 8. The operation of the key 105 of Fig. 8 closes an energizing circuit for a code relay such as relay 126 which is associated with it, it being understood, of course, that a different code relay is associated with each of the individual keys. The relay chains 213 and 414 are started into operation to in turn operate the selecting relays 200 to 211 and 401 to 412 in synchronism.

The contacts of each selecting relay are connected to different combinations of the code-sender contacts so that when the particular one of these selecting relays is energized whose contacts are connected to those of the code sender operated, a circuit is completed from the key through the contacts of the code sender 126 and through the contact of that selecting relay 811 over the line, and over the contacts of the equivalent selecting relay at the remote point 812 energized at that time, to the group and final relays. This control code continues during the interval that the first six selecting relays at each end are energized. Thus, each selection comprises a uniform or equal number of impulses.

The selection made at the remote point closes contacts to an apparatus unit to prepare it for operation and, in addition, closes a contact which causes a code to be transmitted over the last six selecting relays in a manner similar to that already described in the case of control, to make a group and final selection at the dispatcher's office. This operation indicates to the dispatcher which selection was made at the substation by means of a lamp 810 which is illuminated, and also closes a contact which by-passes the selecting relay circuits.

When the thirteenth relay 212 at the dispatcher's office and 413 at the substation are energized, the final operating circuits are closed from the key through the contact 801, contact 802, over the conductor C, contact 803, contact 804 to the circuit breaker. Operation of the circuit breaker transmits back a code over the contact 805, contact 806, conductor S, contact 809 to illuminate the lamp 810, giving the dispatcher an indication of the apparatus unit operated.

It will be seen, in general, that a code first makes a selection at a remote point, which selection in turn transmits back a code to make a selection at the dispatcher's office, which thereupon completes a control circuit to the apparatus unit to be operated.

In order to obtain a better understanding of the invention, a detailed description of the operations which take place when the dispatcher operates his key in order to operate an apparatus unit will now be given.

Normally the drive circuit extending between the dispatcher's office and substation is closed over a circuit from ground through armature 360 and its back contact, winding of relay 305, back contact and armature 361, armature 349 and its back contact, conductor d, armature 519 and its back contact, winding of relay 501, back contact armature 544 and battery to ground.

As a result of the energization of relay 305 at the dispatcher's office obvious energizing circuits are completed for the relays 304 and 306. The energizing of relay 304 prepares an energizing circuit for the relay 302 at armature 322 and its front contact. The energization of relay 306 completes a locking circuit for itself at armature 325 from ground through battery, winding a relay 306, front contact and armature 325, back contact and armature 337, conductor 374 and back contact and armature 299 to ground.

The energization of relay 306 prepares an energizing circuit for the relay 309 at armature 332 and its front contact and opens a locking circuit for the relay 311 at armature 324.

At the substation as a result of the energization or relay 501 over the drive circuit previously traced, an obvious energizing circuit is completed for the relay 505 at armature 547 and its front contact and at armature 546 an energizing circuit for the relay 509 is opened.

As a result of the energization of relay 505, an energizing circuit is prepared for the relay 508 at armature 541 and its front contact, and an energizing circuit is prepared for the relay 502 at armature 551 and its front contact. Operation of an apparatus unit completes this prepared circuit to start the supervisory signaling as will be described more fully hereinafter.

The dispatcher will now operate his start key 108, individual control key 105 and master control key 107 to close their contacts. As a result of closing key 108, a circuit is completed from ground through the contact of the key 108, conductor 170, front contact and armature 322, armature 321 and its back contact, winding of relay 302 and battery to ground. Relay 302 is energized over this circuit and prepares a series locking circuit for itself and the relay 303 at armature 334 and its front contact. This circuit for the relay 303, however, is not effective at this time by reason of the original energizing circuit for the relay 302 which shunts the relay 303.

The key 108 is closed momentarily and then opened. When this happens, the original energizing circuit for the relay 302 is opened and a series circuit for the relays 302 and 303 is completed from ground through battery, winding of relays 302 and 303, in series, front contact and armature 334 and back contact and aramature 335 to ground.

Energization of relay 303 opens a further point in the original energizing circuit of the relay 302 at armature 321 and opens the originally traced normally closed drive circuit at the back contact of armature 360. As a result of the opening of the original drive circuit, the relays 305 at the dispatcher's office and 501 at the substation are denergized.

Deenergization of the relay 305 at the dispatcher's office opens the obvious energizing circuits for the relays 304 and 306 at armature 323, prepares a locking circuit for the relay 301 at armature 323 and its back contact and completes an energizing circuit for the relay 310 from ground through armature 336 and its back contact, armature 333 and its back contact, winding of relay 310 and battery to ground. The energization of relay 310 transfers the drive circuit from the originally closed circuit over the back contact of armature 361 to the line drive relays over the front contact of armature 361.

At the substation as a result of the deenergization of relay 501, a locking circuit is prepared for the relay 504 at armature 547 and an energizing circuit is completed for the relay 509 at armature 546 and its back contact over a circuit from ground through battery, winding of relay 509, back contact and armature 546 and back contact and armature 543 to ground. The energization of relay 509 over the circuit just traced transfers the drive circuit from the normally closed circuit formerly traced to the line drive relays at armature 519 and its front contact.

Up to this point, the circuits traced, it will be noted, were those existing under normal non-operating condition and the immediate result of operating a start key. The drive circuit, it will be recalled, was normally closed but disconnected from the drive relays. Operation of the start key 108 merely transfers this normally closed drive circuit from its non-operating condition to a condition preparatory for operation by placing the line drive relays in its circuit.

A circuit is now completed from ground through battery, armature 332 and its front contact, armature 329 and its back contact, winding of relay 309, back contact and armature 345, front contact and armature 361, armature 349 and its back contact, conductor $d$, armature 519 and its front contact, armature 520 and its back contact, winding of relay 511, back contact and armature 527 and front contact and armature 526 to ground. This is the first closed drive circuit and energizes the line relays 309 and 511 in series from battery at the dispatcher's office to ground at the substation.

As a result of the energization of relay 309 at the dispatcher's office an obvious energizing circuit is completed for the relay 307 over armature 328 and its front contact. The energization of relay 307 completes a series circuit for the relays 307 and 308 over armature 330 and its front contact but this circuit is not effective at this time due to the fact that the original energizing circuit for relay 307 shunts the winding of relay 308.

A further result of the energization of relay 307 is to complete an energizing circuit for the relay 316 from ground through armature 328 and its front contact, armature 326 and its front contact, armature 327 and its back contact, winding of relay 316 through battery to ground. A further result of the energization of relay 307 is to open a possible locking circuit for the relays 312 and 313 in series at armature 331 and to complete an energizing circuit for the relay 213 over a circuit from ground through armature 328 and its front contact, armature 326 and its front contact, armature 327 and its back contact, conductor 370, armature 227 and its back contact, winding of relay 213, armature 281 and its back contact, back contact and armature 297 and battery to ground.

As a result of the energization of the relay 213 over the circuit just traced, a locking circuit is prepared for the relays 213 and 214 in series, but this circuit is not effective at this time because of the fact that the original energizing circuit for the relay 213 shunts the windings of the relay 214.

At the substation as a result of the energization of relay 511 over the first drive circuit formerly traced, an obvious energizing circuit is completed for the relay 512 at armature 521 and its front contact. The energization of relay 512 prepares a series locking circuit for itself and relay 513 over armature 518 and its front contact, opens a possible series locking circuit for the relays 516 and 517 at armature 529 and completes an energizing circuit for the relay 414 over a circuit from ground through armature 521 and its front contact, armature 522 and its front contact, armature 523 and its back contact, conductor 560, armature 454 and its back contact, winding of relay 414, armature 478 and its back contact, back contact and armature 496 and battery to ground. The energization of the relay 414 prepares a series energizing circuit for itself and winding of relay 415 at armature 487 but this circuit is not effective at this time since this original energizing circuit for the relay 414 shunts the winding of relay 415.

Returning now to the dispatcher's office, as a result of the energization of relay 316 previously traced, an obvious energizing circuit is completed for the relay 318 over armature 346 and its front contact and the back contact and armature 347. Energization of the relay 318 opens the drive circuit formerly traced at armature 349. Opening the drive circuit results in the deenergization of the line relays 309 at the dispatcher's office and 511 at the substation.

The de-energization of relay 309 at the dispatcher's office opens the original energizing circuit for the relay 307 at armature 328 and its front contact. As a result, the series locking circuit for the relays 307 and 308 is completed from ground through battery, windings of relays 307 and 308 in series, front contact and armature 330, back contact and armature 340 and back contact and armature 336 to ground. The energization of the relay 308 opens the energizing circuit for the relay 316 and the original energizing circuit for the relay 213 at armature 327 and opens a further point in the original drive circuit at armature 329.

As a result of the opening of the original energizing circuit for the relay 213, the series locking circuit for the relays 213 and 214 is completed from ground through battery, armature 297 and its back contact, back contact and armature 281, windings of relays 213 and 214 in series, front contact and armature 241, back contact and armature 296 to ground. As a result of the energization of the relay 214 over the circuit just traced, a circuit is completed for the selector relay 200 at armature 242 and its front contact over a circuit from ground through battery, winding of relay 200, front contact and armature 242, back contact and armature 283 and back contact and armature 296 to ground.

At the substation, as a result of the opening of the drive circuit which energized relay 511, this relay is deenergized to open simultaneously the original energizing circuit for the relay 512 and the original energizing circuit for the relay 414 at armature 521 and, as a result, the series locking circuit for the relays 512 and 513 is completed from ground through battery, winding of relays 512 and 513 in series, front contact and armature 518, back contact and armature 538 and back contact and armature 542 to ground. The energization of the relay 513 opens a further point in the original drive circuit at armature 527 and opens a further point in the original energizing circuit of relay 414 at armature 523.

As a result of the opening of the original energizing circuit of the relay 414, a series circuit is completed for the relays 414 and 415 in series from ground through battery, armature 496 and its back contact, back contact and armature 478, windings of relays 414 and 415 in series, front contact and armature 487 and back contact and armature 492 to ground. As a result of the energization of relay 415 over the circuit just traced, a further point in the original energizing circuit of the relay 414 is opened at armature 454 and a circuit is completed for the selector relay 401 from ground through battery, winding of relay 401, front contact and armature 486, back contact and armature 488 and back contact and armature 492 to ground.

It will be recalled that the selector relay 200 at the dispatcher's office and the selector relay 401 at the substation are now energized. As a result of the energization of the selecting relay 200 at the dispatcher's office a circuit will now be completed from ground through battery, resistance element 371, conductor 372, through the first contact of the selector switch 200 to ground. This circuit shunts the winding of relay 319 which is a slow release relay and which after an interval of time, will permit its armature 348 to drop to its back position and, as a result, open the energizing circuit for the relay 318 which is thereupon deenergized and again closes the drive circuit d.

A further result of the energization of the selecting relay 200 is to complete an energizing circuit for the relay 311 from ground through the second contact of the selecting relay 200, conductor 373, winding of the relay 311 and battery to ground. The energization of the relay 311 completes a locking circuit for itself from ground through battery, winding of the relay 311, front contact and armature 338, back contact and armature 324, conductor 374 and back contact and armature 299 to ground; prepares an energizing circuit for the relay 314 at armature 339 and completes an energizing circuit for the relay 315 from ground through battery, winding of the relay 315, front contact and armature 337, conductor 374 and front contact and armature 299 to ground.

The energization of the relay 315, it will be noticed, transfers the driving circuit from the line relay 309 to the line relay 314. At the substation, the energization of the selecting relay 401 completes an energizing circuit for the relay 518 from ground through battery, winding of the relay 518, conductor 561 and the first contact of the selecting relay 401 to ground.

The energization of the relay 518 prepares an energizing circuit for the line relay 515 at armature 535, completes a locking circuit for itself from ground through battery, winding of the relay 518, front contact and armature 534, back contact and armature 524, conductor 562 and back contact and armature 494 to ground, and completes an energizing circuit for the relay 510 from ground through battery, winding of the relay 510, the front contact and armature 533, conductor 562 and back contact and armature 494 to ground. The energization of the relay 510 transfers the drive circuit from the line relay 511 to the line relay 515.

Up to this point, the circuits traced have shown how first the line relays 305 and 510 were connected over the drive circuit and functioned to, in turn, complete first partially then completely, circuits for the first counting relays at each station, these relays, in turn, completing an energizing circuit for the selector relays. It will also be noted that when the selector relays at each end were energized, they completed circuits which transferred the drive circuit from the line relays 305 and 510 to line relays 314 and 515, as is about to be described.

The circuit that will now be described for the drive line, it will be noted, will have reversal of polarity from that previously traced and will complete circuits for the second relay in the chain to, in turn, close the second selector relay. This drive circuit, it should further be noted, depends for its completion on the fact that the first relays at each end were properly energized and pulled their armatures up so that no circuits can function to energize second relays in the chain at each end unless the first relays have already been properly operated. In a similar manner, it will be noted, the drive circuit preparatory to operating the third relays in chain will depend for its completion upon the fact that the second relays at each end were properly energized.

In this manner, since the relay chains which are to be operated in synchronism control the circuits which operate them in synchronism, a positive means is provided for maintaining them in synchronism.

A second driving circuit is now completed from ground at the dispatcher's office through armature 339 and its front contact, armature 380 and its back contact, winding of the line drive relay 314, front contact and armature 345, front contact and armature 361, armature 349 and its back contact, drive line d, armature 519 and its front contact, armature 520 and its front contact, winding of line-drive relay 515, back contact and armature 536, the front contact and armature 535 and battery to ground.

Energization of the line relay 314 at the dispatcher's office closes an obvious energizing circuit for the relay 312 over armature 344 and its front contact. The energization of the relay 312 prepares a series locking circuit for itself and 313 at armature 341. This circuit, however, is not effective at this time since the original energizing circuit for the relay 312 shunts the winding of the relay 313. The series locking circuit for the relays 307 and 308 is opened at armature 340. A further result of the energization of the relay 312 is to complete an energizing circuit for the second pair of chain relays from ground through armature 344 and its front contact, armature 342 and its front contact, armature 343 and its back contact, conductor 375, armature 228 and its front contact, armature 268 and its back contact, winding of relay 255, armature 281 and its back contact, back contact and armature 297 and battery to ground.

The energization of relay 255 in this circuit prepares a series locking circuit for itself and winding of relay 256, but this circuit is not effective at this time because of the shunt circuit of the relay 255 heretofore traced. A further result of the energization of relay 312 is to complete an energizing circuit for the relay 317 from ground through armature 344 and its front contact, armature 342 and its front contact, armature 343 and its back contact, winding of relay 317 and battery to ground.

At the substation, as a result of the energizing of the line relay 515, an obvious energizing circuit is completed for the relay 516. The energization of the relay 516 completes a series circuit for itself and relay 517, but this circuit is not effective at this time due to the fact that the original energizing circuit for the relay 516 shunts the winding of the relay 517. The series locking circuit for the relays 512 and 513 is opened at armature 538. A further result of the energization of relay 516 is to complete an energizing circuit for the second pair of counting relays from ground through armature 530 and its front contact, armature 531 and its front contact, armature 532 and its back contact, conductor 563, armature 455 and its front contact, armature 466 and its back contact, winding of relay 428, armature 478 and its back contact, back contact and armature 496 and battery to ground. The energization of the relay 428 prepares a series locking circuit for itself and relay 429, which is not effective at this time because of shunt circuit just traced.

Returning now to the dispatcher's office upon the energization of the relay 317 over the circuit just traced, a circuit is again completed for the relay 318 from ground through armature 346 and its back contact, front contact and armature 347, winding of relay 318, front contact and armature 348 and battery to ground.

The energization of the relay 318 opens the drive circuit at armature 349. As a result of the opening of the drive line at armature 349 the energizing circuit for the line relay 314 at the dispatcher's office and 515 at the substation is opened. As a result of the deenergization of relay 314 at the dispatcher's office, the original energizing circuit for the relay 312 is opened at armature 344 and the series locking circuit for the relays 312 and 313 now becomes effective. Energization of the relay 313 opens a further point in the drive circuit at armature 380 and also opens the original energizing circuit for the relay 255 at armature 343. As a result, the series circuit for the relays 255 and 256 now becomes effective. The energization of relay 256 opens a further point in the original energizing circuit of the relay 255 at armature 268, prepares an energizing circuit for the next relay in the chain at armature 269 and closes an energizing circuit for the second selecting relay 201 over a circuit from ground through battery, winding of relay 201, front contact and armature 284, back contact and armature 243 and back contact and armature 296 to ground.

At the substation, as a result of the opening of the drive line at armature 349 the relay 515 is deenergized and opens the original energizing circuit for the relay 516 at armature 530. The series locking circuit for the relays 516 and 517 now becomes effective. As a result of the energization of relay 517, a further point in the line circuit is opened at armature 536 and the original energizing circuit for the relay 428 is opened at armature 532. As a result, the series locking circuit for the relays 428 and 429 now becomes effective. As a result of the energization of the relay 429, a further point in the original energizing circuit of the relay 428 is opened at armature 466. A circuit is prepared for the next counting chain relay at armature 467 and a circuit is completed for the second selecting relay 402 at armature 489 from ground through battery, winding of relay 402, front contact and armature 489, back contact and armature 485, and back contact and armature 492 to ground.

At the dispatcher's office, as a further result of the energization of selecting relay 201, a circuit is completed from ground over the second contact of the selecting relay 201, conductor 374, through the windings of relay 304 and 306 in parallel, and battery to ground.

The energization of the relay 306 opens the locking circuit for the relay 311 at armature 324, prepares a locking circuit for itself at armature 325 and prepares the first traced drive circuit at armature 332.

The relay 311 is deenergized by reason of its locking circuit being open at armature 324 and as a result closes a locking circuit for the relay 306 from ground battery, through winding of the relay 306, front contact and armature 325, back contact and armature 337, conductor 374 and back contact and armature 299 to ground.

At the substation, as a result of the energization of the selecting relay 402, an energizing circuit is completed for the relay 514 from ground through the third contact of selecting relay 402, conductor 563, winding of relay 514, and battery to ground. The energization of relay 514 prepares a locking circuit for itself at armature 525, prepares the drive circuit at armature 526 and opens the locking circuit for the relay 518 at armature 524.

As a result of the deenergization of the relay 518 a further point in the former drive circuit is opened at 535 and a locking circuit is completed for the relay 514 at armature 533. As a result of the deenergization of the relay 518 the energizing circuit for the relay 510 is opened at armature 533 and the armature 520 transfers the drive circuit from line relay 515, back to 511, as originally traced.

The third drive impulse will now operate in the manner already described to energize the third pair of counting relays 215 and 216 at the dispatcher's office, and 416 and 417 at the substation which, in turn, will control their selecting relays 202 and 403, individually.

In this manner the counting chain will operate synchronously in a predetermined sequence transferring the control and supervisory line circuit from selecting relay to selecting relay. This will continue from step to step until the 13th selecting relay 212 is energized.

At the dispatcher's office, it will be recalled that, in addition to closing the start key 108, the individual control key 105 was closed. As a result of the operation of the key 105 to close its lower contacts, a circuit is completed for the code relay 126 from ground through battery, winding of relay 126, the contact of the key 105 through the upper contact of key 102 and back contact and armature 125 to ground. Energization of relay 126 closes its contacts to complete a locking circuit for itself from ground through battery winding of relay 126, first contact, back contact and armature 123 and ground. An obvious energizing circuit is completed for relay 124 which prevents further energization of code relays. Attention is called, at this time, to the novel circuit arrangements of the individual keys 105, 102, etc. The operating circuit for the key 105 is completed through a contact of key 102. Thus, if key 102 is operated, the key 105 is rendered non-operative until the key 102 is restored. Similarly, any keys placed beyond key 105 control-operating circuits which are completed through contacts of all the preceding keys, so that only one code-sender is operative at any time. By this arrangement, the need for finder switches, commonly used in code-sending systems, is eliminated and no confusion of impulses will result, even though the keys are closed simultaneously.

In this manner, the selecting relays 200 to 212 will be energized in sequence and in synchronism with the selecting relays 401 to 413 at the substation. When the selecting relay 200 at the dispatcher's office and the selecting relay 401 at the substation are energized, a circuit will be completed from ground through the fourth contact of armature 127, conductor 180, over the third contact of the selecting relay 200, control line C, the third contact of the selecting relay 401, conductor 484, armature 712 and its back contact, the winding of relay 709 and battery to ground.

As a result of the energization of the relay 709, its contacts will be closed, thus making the first or group selection. The energization of relay 706 is the other group selection that might have been operated at this time. It will be recalled that the circuit traced for the energization of relay 709 was completed over the control line C. If a code relay, other than relay 126, had been energized as a result of the operation of some other individual keys, such as 102, the first circuit would have been completed over the supervisory line S through the second contact of the first selecting relay at the substation to the group relay 706. Another result of the energization of relay 709 is to complete an energizing circuit for the relay 710 from ground to battery, winding of relay 710, the second contact of bank 713, conductor 755 and back contact and armature 493 to ground.

The energization of relay 710 opens the contacts at its armature and prevents any further group selection. The relay 709 locks itself over a circuit from ground to battery, winding of relay 709, the first contact of the bank 713, conductor 755 and back contact and armature 493 to ground.

As the selecting relays continue to be energized, the final selections will be made, selecting relay 201 and its equivalent at the substation, making possible the selection of two relays of the final selection, and similarly relay 202 at the dispatcher's office and its equivalent at the substation, enabling the energization of two other final selecting relays, etc.

In this particular instance, upon the energization of relay 201, a circuit is completed from ground through the fifth contact of armature 127, conductor 171, the fourth contact of the selecting relay 201, control line C, the third contact of the selecting relay 402, conductor 483, the second contact of bank 713, selecting relay 715 and battery to ground. The energization of the final selecting relay functions to prepare the circuit for the selected apparatus unit and also to prepare a circuit for transmission back to the dispatcher's office of a code indicative of the circuit selected so that before actual operation, the dispatcher is informed of the particular unit he is to operate.

A further result of the energization of relay 715 is to complete a locking circuit for itself from ground to battery, winding of the relay 715, the first contact of its armature 732, conductor 482, back contact and armature 493 to ground. A further result of the energization of relay 715 is to complete an energizing circuit from ground through battery, winding of relay 618, conductor 640, the second contact of relay 715 and ground.

The energization of relay 618 opens the circuits for the supervisory impulses at armature 620 as will be explained in more detail hereinafter, and completes an energizing circuit for the relay 705 from ground, armature 647 and its front contact, conductor 641, winding of relay 705 and battery to ground.

Energization of relay 705 opens its series of contacts 707 and prevents any further selections being made. The selecting relays now continue to step without any further functioning until the sixth selecting relay at each end is energized. It should be noted at this time that the first six selecting relays function to transmit a control code for the selection of an apparatus unit at the distant station and that the last six selecting relays function to transmit an identification code indicative of the circuit selected.

If the indication received by the dispatcher of the selected circuit is identical with that for which he performed his operation, he can, upon the totalizing at the thirteenth point, perform the desired operation, there being thereafter a cleared line wire from the dispatcher's office to the selected unit. When the selecting relay 206 at the dispatcher's office and the selecting relay 407 at the substation are energized, a circuit is completed from ground at the substation through a contact of the relay 715, conductor 481, the second contact of armature 447, over line S, the second contact of relay 206, conductor 176, armature 155 and its back contact, winding of the relay 152, back contact and armature 158 and battery to ground.

The energization of relay 152 closes its bank contacts 153, thereby making the first or group selection. The energization of the relay 152 completes a locking circuit for itself from ground through battery, armature 158 and its back contact, winding of the relay 152, the first contact of the bank 153, conductor 185 and back contact and armature 299 to ground. Energization of some other final selecting relay in some other group would have completed the first code circuit over the control line C through the first contact of the selecting relay 206 to the winding of relay 130, thus making a different group selection.

As a further result of the energization of relay 152, a circuit is completed for the relay 159 from ground through battery, winding of the relay 159 and the second contact of the bank 153 to ground. Energization of the relay 159 opens its armature contacts and thereby prevents any further group selection. Upon the energization of the next selecting relay 207 and its equivalent relay 408 at the substation, the final selecting circuit is completed from ground through the second contact of the bank 732, conductor 480, the first contact of the selector switch 408, line C, the first contact of the selector relay 207, conductor 190, the fourth contact of the bank 153, winding of relay 140 and battery to ground.

The energization of the relay 140 completes a locking circuit for itself from ground through battery, winding of the relay 140, the first contact of the bank 150, conductor 185 and back contact and armature 299 to ground. Upon the energization of the relay 140, an obvious energizing circuit is completed for the lamp 161 which, in actual practice, of course, is placed next to its individual control key and by the illumination of which the dispatcher is appraised of the fact that the unit selected for operation at the remote point is the same as that for which he operated his key.

Upon the operation now of the last or final selecting relay 212, at the dispatcher's office and relay 413 at the substation, by their respective chain relays 226 and 427 a line wire is cleared for the apparatus unit selected for operation over a circuit from ground through either alternator 191 or 192, depending upon whether the desired operation is to be an opened or closed operation over the conductor, in this case 193, the lower contact of the master switch 107, contact of the individual control switch 105, conductor 194, the third contact of the bank 127, the third contact of the bank 150, conductor 194, the fourth contact of the selecting relay 212 over the control line C, the fifth contact of the selecting relay 413, conductor 479 to end relays 734 and 735 to ground, the circuit of these latter relays being tuned to the frequency of the generator 191. The generators 191 and 192 generate currents of 500 and 650 cycles, respectively, and the receiving relays 734, 735 and 739, 740 are responsive to currents of 500 and 650 cycles, respectively. It is understood, however, that any desired frequencies may be employed. It should be noted that this circuit is completed from the key through identification relay over the thirteenth selecting relay at each end of the line. Therefore not only must the identifications agree with the key set up, but synchronization of the relay chain must totalize as correct. In other words, the system renders it impossible for the dispatcher to make a false operation even though he should try to do so.

Upon the energization of the relays 734, 735, an obvious energizing circuit is completed for the relay 737. Energization of the relay 737 completes an energizing circuit from ground through armature 738 and its front contact, conductor 760, the third contact of the bank 732, conductor 761, winding of relay 613 and battery to ground. The energization of the relay 613 completes an obvious energizing circuit for the solenoid 616 which, in turn, completes an obvious energizing circuit for the operating winding 632, thereby closing the circuit breaker 601 in accordance with the operation at the dispatcher's office.

As a result of the closing of the circuit breaker, the upper contacts of its pallet switch are opened and the lower ones closed. It will be observed at this time that with the circuit breaker normally open, there is an energizing circuit completed for the relay 612 which, in turn, completes an energizing circuit for the slow release relay 611. Upon deenergization of the relay 612, following the closing of the circuit breaker, the energizing circuit for the slow release relay 611 is opened at the armature 650 and its front contact and an energizing circuit is completed for the relay 610 from ground over armature 828 and its back contact, the front contact and armature 627, the back contact and armature 625 to the winding of relay 610 and battery to ground.

This circuit is completed since relay 611, being of a slow-release type, will not permit its armature to drop to its back position for an interval of time after the armature of relay 612 has dropped to its back position.

Energization of relay 610 completes a locking circuit for itself over armature 626 and 623 and opens further supervisory circuits at armature 624. The novel circuit arrangements which applicant employs to transmit codes individual to circuit breaker operations without the use of a finder switch for preventing scrambling of signals when more than one circuit-breaker operation at a time takes place, is disclosed in detail in Fig. 6. Relays 608, 610, etc. are individual to the circuit breakers. Operation of any circuit breaker, such as 601, for example, to its closed position will open the energizing circuits of the relays 611 and 612. Since relay 611 is a slow-release relay, the armature 627 will still close its front contact when the armature 628 is closing its back contact, and a momentary circuit is completed for the relay 610, which thereupon locks itself over armature 626. The energization of relay 610 completes an energizing circuit for a particular relay in a particular group individual to that particular circuit breaker over the front contact of armature 624, as will be described in more detail hereinafter, while simultaneously opening any such operating circuit for all succeeding individual relays such as 608. The relay 618 energizes following the closing of any individual code relay 714 to 723, and prevents the energization of any individual code relay 608 to 610 preceding the operated code relay. Thus, upon energization of the relay 608 in response to the operation of its individual circuit breaker, an operating circuit for a code relay is completed over armatures 620 and 624 and their back contacts. The energization of code relay energizes the relay 618, thereby rendering the code operating circuit of the relay 610 ineffective, while, at the same time, the armature of 608, upon opening its back contact, disconnects the individual relays of all succeeding circuit breakers. In this manner, only one circuit breaker can obtain control of the code-sender at any one time, and only after the code-transmitting apparatus has been restored following the complete transmission, are circuits again prepared for some other circuit breaker. This will be the circuit breaker which is electrically nearest the code-sending device. After an interval of time, the relay 611 will be deenergized to permit its armature to drop to its back position. This time is determined by the characteristic of the circuit breaker, namely, the time it will take for the circuit breaker to close and latch closed, since it is obvious that until the circuit breaker is latched closed the energizing circuit for itself should be complete.

As a result of the deenergization of the relay 612, a supervisory impulse is transmitted over the line from ground through battery, back contact and armature 629, conductor 762, the fourth contact of the selector switch 715, conductor 488, the fourth contact of the selector switch 413, over the supervisory line S, the third contact of the selector switch 212, conductor 195, the second contact of the switch 150, the armature 127 and its back contact, winding of relay 196 and ground.

The energization of the relay 196 thus traced operates its armature to release the latched armatures 118 and 119. As a result of the release of the armature 118, an obvious energizing circuit is completed for the signal lamp 104, thereby giving the supervisory indication that the circuit breaker has been closed. An obvious energizing circuit is also completed for the relay 120 at armature 119. The energization of the relay 120 transfers the supervisory circuit from the relay 196 to the relay 117.

Upon the energization of relay 268 at the dispatcher's office, armature 281 is operated to open its contact. It will be noted from the circuits traced for the relay chain that they were all locked over armature 281 and its back contact. The locking circuit for these relays is, therefore, now completed in series with the winding of relay 298. The resistance of relay 298 is sufficient to reduce the current enough to cause all the chain relays to deenergize. The relay 298 itself energizes.

Upon the opening of the contact of the armature 281, the relay 298 is energized in series instantaneously with the relays of the chain. Energization of relay 298 energizes the relay 295 over an obvious energizing circuit opens the locking circuit for the drive relays at armature 299 and completes an obvious energizing circuit for the relay 301. The energization of the relay 301 opens a further point in the locking circuit for the drive relays at armature 336 and opens the start circuit at armature 335, thereby deenergizing the relays 302 and 303. A locking circuit is also completed for the relay 301 from ground to battery, winding of relay 301, front contact and armature 320, back contact and armature 323 to ground.

The locking circuit for the group selecting relay 152 and the locking circuit for the final selecting relays are also opened at armature 299 and these relays are restored to normal. The relay 159 will be deenergized at the contacts of bank 153 and restore its armatures to normal.

At the substation, upon the energization of the last chain relay 441, the locking circuit of the counting relays is opened at armature 281, and these relays are now energized in series with relay 295. The resistance of relay 295 is such as to decrease the current flow sufficiently to deenergize the counting relays but sufficient current to energize relay 495. The energization of relay 495 opens the locking circuits at the armature 496 for the relay chains, thereby restoring these to their normal condition. An obvious energizing circuit is completed for the relay 491 at armature 494 and its front contact. The energization of the relay 491 opens a further point in the locking circuit of the chain relays at armature 492, opens the energized group and final selecting relays as well as the locking circuit for the relays 705 and 710 at armature 493.

As a further result of the energization of relay 495, the locking circuit for the drive relays is opened at armature 494 and an energizing circuit is completed for the relay 504. Since the start operations begin at the dispatcher's office, this will have no effect at this time. In this manner, the apparatus at both stations are restored to normal preparatory to a further operation of the dispatcher or automatic operation of an automatic unit at the substation.

The relay 504 locks itself over the front contact and its armature and the back contact and armature 547 and at armature 543 opens the locking circuit of the relays 502 and 503. At the office, upon energization of relay 298, an energizing circuit is completed for the relay 301 over the front contact of armature 299. Relay 301, upon energization, locks itself over the armature 320 and its front contact and the back contact and armature 303 opens the locking circuit of the relays 302 and 303 at armature 335, and opens the locking circuit of the drive relays at armature 336. The energizing circuit for the relay 310 is opened at the back contact and armature 336. As a result of the deenergization of the relays 303 at the office and 503 at the substation, the original holding circuit for the relays 305 and 501 is again completed over a circuit from ground and armature 360 and its back contact to the winding of relay 305, the back contact and armature 361, armature 340 and its back contact from the conductor $d$, armature 519 and its back contact through the winding of relay 501 and the back contact and armature 544, through the battery to ground.

From the foregoing detailed operation, the manner in which a code is transmitted to select an apparatus unit for operation and the supervisory operations which take place as a result, is evident and a very general explanation of the operations which result due to the automatic operation of a circuit breaker at the substation should be all that is needed for a clear understanding of the operation of this invention.

Should a circuit breaker be automatically operated, as, for example, the circuit breaker 600 being operated from the open to the closed position, this operation will as is evident, cause the deenergization of the relay 606, which, in turn, will deenergize the relay 607 after the energization of the relay 608, which latter relay is locked over its armature. As a result of the energization of relay 608, an energizing circuit is completed for the relay 617 and one of the selecting relays in series, in this particular instance, 714, which locks itself up in a manner already described.

The energization of the relay 608 operates its armature to open a circuit at its back contact and closes it at its front contact, thereby preventing the automatic operation of any other circuit breaker from having an effect at that time. The energization of relay 617 closes an energizing circuit over its armature 621 and its front contact, the conductor 671, armature 551 and its front contact, armature 549 and its back contact, winding of relay 502 and battery to ground. Energization of the relay 502 prepares an energizing circuit for itself and relay 503 in series over armature 545 and completes an obvious energizing circuit for the relay 508 at armature 548. The energization of the relay 714 completes an energizing circuit for the relay 618 from ground through battery, winding of relay 618, conductor 640, and through the second contact of the relay 714 to ground. As a result of the energization of relay 618, the original energizing circuit for the relay 617 is opened at armature 620. Deenergization of the relay 617 opens the original energizing circuit for the relay 502 at armature 621.

Upon opening of the original energizing circuit for the relay 502, the relays 502 and 503 are energized in series and the normally closed drive circuit is opened at armature 544. From this point, the relay chains function in a manner already described to operate the selecting relays which function to transmit the code individually to the circuit breaker which operates to inform the dispatcher of the operation. The drive circuits now function in the manner which has already been described in detail to energize the counting relays 414 to 441. As the counting relays energize, the selecting relays 401 to 413 are successively energized and deenergized. As each selecting relay 407 to 412 energizes, circuits are prepared for the code transmission, which, in turn, is determined by the particular code relay, in this case 714, which is energized. In the present illustration, with the relay 714 energized, a circuit is completed when the selecting relay 407 is energized over the supervisory line to make the first or group selection, and a second circuit is completed when selecting relay 408 is energized over the supervisory line to make the final selection. The group and final selection impulse operates in the same manner as has already been described in detail to complete a circuit for supervision. The supervisory signal is transmitted when the last selecting relay 212 at the office and 413 at the substation are energized.

A few of the important and novel features of this invention will now be noted. Upon the energization of one of the individual relays 126 and 128, an obvious energizing circuit is completed for the relay 124, which energizes and thereupon removes, ground from any of the other individual control keys, thereby preventing mutilization of signals by the operation of more than one individual control key at a time. By the operation of the key 109, the last selecting relay is held energized so that if an automatic operation takes place when the dispatcher is away from his desk, the code will be transmitted thereto and trapped, so to speak, at the last selecting relay over which the supervisory impulse is transmitted. When the dispatcher returns to his desk, by releasing this key and permitting the impulse to come through, he is enabled to see instantaneously which unit, if any, changes its operation.

This is accomplished by maintaining the contacts of key 109 open. It will be recalled from the above description that the driving circuit operation is controlled by the closing of each selecting relay which completes circuits through the last contact for shunting the relay 319. The relay 319 is thus deenergized to open the energizing circuit for the relay 318, which, in turn, upon deenergization, completes the driving circuit for the next operation. By maintaining the key 109 in an open position, the shunt circuit for the relay 319, which is completed through the last selecting relay 212 over the contacts of the key 109, is now open and the relay 319 remains energized through resistance 371 and battery to ground. With this condition, the driving circuit cannot function to complete the last cycle for restoring the apparatus to normal, and the last selecting relay which completes a direct circuit from the circuit breaker operated to the supervisory line is maintained closed. The dispatcher may then at any time restore the apparatus to normal by closing the contacts of key 109. When leaving the dispatcher's desk, he may, by opening the key 109, prevent any supervisory signal from coming in during his absence without being called to his direct attention.

The drive circuit functions in the manner described above to energize the selecting relays until the selecting relay 413 is reached. Upon energization of the relay 413 an energizing circuit is completed for the relays 770 and 773 from ground through the winding of the relay 773, conductor 779, through the fourth contact of the selecting relays 413, conductor 780, back contact and armature 778, to the winding of relay 770 to ground. As a result of this circuit the relays 770 and 773 are energized simultaneously. But the relay 773 locks itself over the armature 783, conductor 784 and through the last contact of the selecting relay 413 to ground. As a result of the energization of relay 773, an energizing circuit is completed for the relay 680 from ground to battery, to the winding of the relay 680, conductor 681 through the sixth contact of the selected relay 715, over conductor 786, the back contact and armature 776, back contact and armature 775 and the front contact and armature 774 to ground. As a result of the energization of relay 680, the locking circuit for the relay 608 is opened and this relay is deenergized by restoring the apparatus and conditioning any other apparatus unit for transmitting a code.

A multiple circuit is completed for the relay 518 from ground through battery, the winding of relay 518 over conductor 561, through the third contact of the selecting relay 413 and over conductor 786 to the back contact and armature 776, back contact and armature 775, front contact and armature 774 to ground.

As a result of the energization of the relay 518, it completes its own locking circuit of armature 534, breaks the locking circuit of relay 514 and prepares a drive circuit all in a manner which has already been described in detail above.

Energization of relay 770 completes an obvious energizing circuit for relay 771 over its wiggle tail armature 777. This armature 777 is of a special type which when released vibrates between its armatures for an interval of time after which it comes to rest intermediate the two contacts.

After an interval of time the slow release relay 771 which is also slow to operate moves its armature 776 to open the above-described circuits for the relay 680 and 518 but not until the relay 680 has energized to open a locking circuit for the relay 608 and the relay 518 has energized and locked over its own circuit.

A further result of the energization of relay 773 is to open an energizing circuit for the relay 770 at armature 778, and armature 777 is thereupon released to complete the energizing circuits for the relays 771 and 772. After an interval of time, armature 777 will then come to rest at its mid-position, and the relays 771 and 772 will deenergize. The apparatus is now in condition for the last drive impulse which is controlled as described above from the dispatching office for finally restoring the apparatus to normal.

A further novel feature is the storing device used in registering changes in the position of the apparatus units and preventing loss of signals. In Fig. 6, upon the changes of any apparatus unit, as already pointed out, its individual relay 608 or 610 is energized and prevents the movement of its armature from its back to its front position or any other relay from effecting the code transmitted until the previous code has been transmitted, whereupon a code will again be transmitted responsive to the nearest circuit breaker which is operated.

It is obvious, of course, that any other code than the particular one disclosed may be used. Thus, for example, the number of selections with the present code can be considerably increased by transmitting positive and negative impulses over both the control and supervisory line; that is, the first selecting relay may be employed to make four group selections, using positive and negative impulses over the control and supervisory lines.

The remaining selecting relays may be employed to transmit the final selections, four for each relay, as described above, thus making four groups of 20 selections each, or a total of 80 selections. Similarly a code of five impulses can be employed in this system.

In place of the selecting relays, it is also obvious that the standard telegraph distributor can be employed, since the selecting relays function as a distributor and the relay chain can be replaced by some drive means, since this broadly is the function of the relay chain.

Although this invention has been described in connection with supervisory control, it is obvious that the novel selecting arrangements disclosed are applicable to any signalling system which employs selections, such as telegraph, telephone, railway signalling, street lighting, fire alarm signalling, etc.

I claim as my invention:

1. In a supervisory control system, the combination with a first station, a second station, distributors at each station, apparatus units at said second station and keys individual thereto at said first station, of means including one of said distributors responsive to the operation of one of said keys for transmitting a code individual to said key, means including said distributor at said second station responsive to said code for selecting an apparatus unit for operation, means whereby a code is transmitted to said first station individual to the unit selected, and means whereby said unit thereafter is placed under the direct control of said key.

2. In a supervisory control system comprising a first station, a second station, a signalling line connecting said stations and a relay chain at each station, the combination with apparatus units at said second station and corresponding keys at said first station, of means whereby said relay chain at said first station transmits a code over said line corresponding to an operated key, means whereby said chain at said second station receives said code to select an apparatus unit for operation, and means whereby said selected unit is brought under direct control from said first station over said line.

3. In a signalling system, a first station, a second station, apparatus units at said second station, chains of relays at each station, means for operating said chains of relays in synchronism, means including said chains of relays for transmitting code combinations of impulses to select one of said apparatus units for operation, means including said chains of relays for transmitting code combinations of impulses to said first station individual to said selected apparatus unit, and means for operating said selected apparatus unit.

4. In a supervisory control system, a first station, a second station, apparatus units at said second station, chains of relays at each of said stations, individual operating circuits for each of said apparatus units, means including said chains of relays for transmitting code combinations of impulses from said first to said second station and for simultaneously conditioning an operating circuit individual to the unit to be selected by said code, means responsive to said code combination of impulses for selecting one of said apparatus units and means responsive to said selection for completing said individual operating circuit.

5. In a supervisory control system, a first station, a second station, apparatus units at said second station, chains of relays at each of said stations, individual operating circuits for each of said apparatus units, means including said chains of relays for transmitting code combinations of impulses from said first to said second station and for simultaneously conditioning an operating circuit individual to the unit to be selected by said code, means responsive to said code combination of impulses for selecting one of said apparatus units, means responsive to said selection for completing an individual operating circuit, a drive circuit connecting said stations, means including said chains of relays for transmitting impulses over said drive circuit, means responsive to the drive circuit impulses for operating said chains of relays in synchronism.

6. In a supervisory control system, a first station, a second station, apparatus units at said second station, a chain of relays at each of said stations, a drive circuit connecting said stations, means including said drive circuit for transmitting impulses of alternate polarity, means responsive to said impulses for operating said chains of relays in synchronism, means including said chains of relays for transmitting code combinations of impulses, means responsive to said code for selecting one of said apparatus units, means following the selection of said unit for continuing the operation of said chains of relays until all of said relays have been operated and means operative in the event said relays continue in synchronism throughout their operations for operating said selected apparatus unit.

7. In a supervisory control system, a first station, a second station, apparatus units at said second station, signalling devices individual thereto at said first station, a chain of relays at each of said stations, means for operating said chains of relays in synchronism, means including said chains of relays for selecting one of said apparatus units for operation, means including said chains of relays for selecting its individual signalling device, means for continuing the operation of said chains of relays following said selection and means operative in the event said chains of relays remain in synchronism throughout their operation for operating said apparatus unit from said first station and for operating the signalling device individual to said apparatus unit in response to the operation of said unit.

8. In a supervisory control system, a first station, a second station, apparatus units at said second station, synchronous distributor means at each of said stations, means including said distributors for transmitting code combinations of impulses from said first station to said second station, means responsive to said code combination of impulses for selecting one of said apparatus units and means for completing an operating circuit to said selected unit in the event that the selected unit is associated with the code which was transmitted for selection and said distributors have maintained constant synchronism.

9. In a supervisory control system, a first station, a second station, apparatus units at said second station, synchronous relay chains at each of said stations, means including said relay chains for transmitting code combination of impulses from said first to said second station, means responsive to said code combinations of impulses for selecting one of said apparatus units and means for completing an operating circuit to said selected unit in the event that the selected unit is that one for which the code was transmitted for selection and said relay chains have maintained constant synchronism.

10. In a supervisory control system, a first station, a second station, apparatus units at said second station, means at said second station for selecting one of said apparatus units at one time for operation, means at said first station for controlling the selecting operation of said selecting means to select a particular unit, said first station selecting means including means for simultaneously conditioning an individual operating circuit for said selected apparatus unit, means at said first station operated by the selection of said selected apparatus unit for identifying the unit selected, and means controlled by said last-mentioned means for completing said prepared operating circuit, whereby said selected apparatus unit is controlled from said first station.

11. In a supervisory control system, a first station, a second station, apparatus units at said second station, selecting mechanism at said second station for selecting one of said apparatus units at one time for operation, means at said first station for controlling the selecting operation of the selecting mechanism to select a particular unit, said first station means including means for simultaneously conditioning an operating circuit individual to said selected unit, means at said first station operated by the selection of said apparatus unit for identifying the unit selected, and means controlled by said last-mentioned means for completing said prepared individual operating circuit, whereby said unit is controlled from said first station.

12. In a supervisory control system, a first station, a second station, apparatus units at said second station, synchronous distributor means at each of said stations, means including said distributors for selecting one of said apparatus units for operation from said first station, said means including other means at said first station for simultaneously conditioning an operating circuit individual to said selected unit, means at said first station operated by the selection of said apparatus unit for identifying the unit selected, and means controlled by said last means for completing said prepared individual operating circuit.

13. In a supervisory control system, a first station, a second station, apparatus units at said second station, a distributor at said second station, means for transmitting code combinations of impulses from said first station to said second station individual to a selected unit, said means including means for simultaneously conditioning an operating circuit individual to said unit, means including said distributor responsive to said received code combinations of impulses for selecting said unit individual to the code, means operated by the selection of said unit for identifying said unit at the first station, and means controlled by said last means for completing said prepared individual operating circuit.

14. In a supervisory control system, a first station, a second station, apparatus units at said second station, synchronous distributor means at each of said stations, means including said distributors for selecting one of said apparatus units for operation from said first station, means at said first station for controlling the operation of said first-mentioned means to select a particular unit, said first station means including means for simultaneously conditioning an individual operating circuit for said selected unit, means at said first station operated by the selection of said unit for identifying the unit selected, and means controlled by said last means for completing said prepared operating circuit.

In testimony whereof, I have hereunto subscribed my name this 3rd day of February 1926.

THOMAS U. WHITE.